(12) United States Patent
Van Den Bergh et al.

(10) Patent No.: US 9,046,748 B2
(45) Date of Patent: Jun. 2, 2015

(54) METHOD OF COOLING A LAMP

(75) Inventors: John-john Pieter Jan Van Den Bergh, Turnhout (BE); Ludo Valère Maurice Schreel, Maldegem-donk (BE); Stijn Lenni Robbert De Vijlder, Zoersel (BE); Kristin Annemie Dirk Gysels, Wilrijk (BE); Jasper Cuyvers, Geel (BE)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 177 days.

(21) Appl. No.: 13/579,456

(22) PCT Filed: Feb. 18, 2011

(86) PCT No.: PCT/IB2011/050678
§ 371 (c)(1),
(2), (4) Date: Feb. 5, 2013

(87) PCT Pub. No.: WO2011/104658
PCT Pub. Date: Sep. 1, 2011

(65) Prior Publication Data
US 2013/0194553 A1    Aug. 1, 2013

(30) Foreign Application Priority Data
Feb. 25, 2010    (EP) .................................... 10154599

(51) Int. Cl.
*G03B 21/18* (2006.01)
*G03B 21/16* (2006.01)
*H01J 61/52* (2006.01)

(52) U.S. Cl.
CPC ................. *G03B 21/16* (2013.01); *H01J 61/52* (2013.01)

(58) Field of Classification Search
CPC ...... H05B 41/24; H05B 41/36; H04B 41/292; H01J 7/24
USPC ............................... 353/51–56; 362/184, 373
See application file for complete search history.

(56) References Cited

U.S. PATENT DOCUMENTS

| 2,090,908 | A | 8/1937 | Anderson | |
|---|---|---|---|---|
| 2008/0231812 | A1* | 9/2008 | Sakai et al. | 353/58 |
| 2008/0316435 | A1* | 12/2008 | Kobayashi | 353/52 |
| 2010/0201955 | A1 | 8/2010 | Jougo | |

FOREIGN PATENT DOCUMENTS

| EP | 1006734 A2 | 6/2000 |
|---|---|---|
| JP | 2004164999 A | 6/2004 |

(Continued)

*Primary Examiner* — William C Dowling
*Assistant Examiner* — Jerry Brooks

(57) ABSTRACT

The invention describes a method of cooling a lamp (1) in a projector (2, 2') independently of an orientation ($P_{desk}$, $P_{ceiling}$) of the projector (2, 2'), which method comprises directing a cooling airflow (4) symmetrically at a burner (10) of the lamp (1) during operation of the lamp (1); and controlling the cooling airflow (4) alternately between at least a first cooling level (C-I) and a second cooling level (C-II) such that, during cooling at the first cooling level (C-I), the temperature ($T_{base}$) in a base region of the burner (10) drops below a predefined minimum operating temperature ($T_{min}$) to allow a blackening of an inside wall (100) of the burner (10), and during cooling at the second cooling level (C-II), the temperature ($T_{top}$) in an upper region of the burner (10) increases above a predefined maximum operating temperature ($T_{max}$) and the temperature ($T_{base}$) in the base region of the burner (10) increases above the predefined minimum operating temperature ($T_{min}$) to facilitate a cleaning of the burner wall (100). The invention further describes a cooling module controller (31) for use in an orientation-independent cooling arrangement (30) of a projector (2, 2'); an orientation-independent cooling arrangement (30) for cooling a lamp (1) in a projector (2, 2') independently of an orientation ($P_{desk}$, $P_{ceiling}$) of the projector (2, 2'); and a projector (2, 2').

15 Claims, 5 Drawing Sheets

(56) References Cited

FOREIGN PATENT DOCUMENTS

| | | | |
|---|---|---|---|
| JP | 2006154002 A | 6/2006 | |
| JP | 2010113979 A | 5/2010 | |
| WO | 2006072852 A1 | 7/2006 | |
| WO | 2006072861 A1 | 7/2006 | |
| WO | 2008020366 A2 | 2/2008 | |
| WO | WO 2008/020366 * | 2/2008 | ........... H05B 41/292 |

* cited by examiner

METHOD OF COOLING A LAMP

FIELD OF THE INVENTION

The invention describes a method of cooling a lamp in a projector, an orientation-independent cooling arrangement for cooling a lamp in a projector, a cooling module controller and a projector.

BACKGROUND OF THE INVENTION

Lamps such as high-power metal halide lamps are favored for applications in which a steady, very bright point-like source of light is required. For example, many projection systems use a high-pressure mercury-vapor metal-halide arc lamp, comprising a discharge chamber, or 'burner', in a quartz glass envelope capable of withstanding high temperatures. The burner contains a filling consisting of one or more rare gases, and, in the case of a mercury-vapor discharge lamp, mainly of mercury. By applying a high voltage across two electrodes (generally tungsten) protruding into the burner, a light arc is generated between the tips of the electrodes, which can then be maintained at a lower voltage. Optical properties such as a natural spectral composition and a high luminous intensity can best be achieved with high-intensity discharge (HID) lamps and, in particular, ultra-high-performance (UHP) lamps.

The temperature in the burner of such a lamp easily reaches several hundreds of degrees Celsius, and a high operating temperature is required for the halogen cycle to function correctly. At these high temperatures, tungsten evaporates from and is re-absorbed by the electrodes (tungsten transport). Convection currents in the burner result in the top of the burner being hotter than the bottom (here and in the following, the term 'top' is to be understood to be the uppermost region in the burner, while the term 'base' is used to refer to a lower or bottom region in the burner). However, the temperature in the lamp should not be allowed to increase too much, since the quartz of the burner wall will crystallize when subject to very high heat for prolonged length of time. For this reason, a lamp in a device such as a projector is generally cooled during operation, for example by directing a cooling airflow at the lamp, and the cooling airflow is directed primarily at the top or upper region of the lamp, so that this hotter region is cooled to a greater extent than the lower regions. This type of cooling is referred to as an 'asymmetrical cooling'. Cooling is generally controlled so that the difference or delta between top and bottom burner temperature for a high-power halogen lamp lies within a certain span, for example 50° K to 100° K for a UHP lamp type. However, it may be advantageous to be able to operate a projector in different vertical orientations and not just a single, fixed position. A portable projector that is used in a ceiling position (e.g. for showing movies) could also be used in a desktop position (e.g. for a presentation), or vice versa. A fixed asymmetrical cooling of the type described above, designed for use only in a certain position (either ceiling or desktop) is unsuitable in such cases, since the cooling airflow is directed primarily towards the base of the burner when the projector is in the 'wrong' position, so that the base is cooled too much and the critical upper region is not cooled enough. As a result of the low temperature in the base, the mercury vapor condenses here. This has a detrimental impact on the functionality of the halogen cycle. When an excessive amount of mercury condenses as a result of over-cooling the base, the halogen will dissolve in that liquid mercury. As a result, not enough of the volatile halogen (e.g. bromine) is available in the rest of the burner to prevent the evaporated tungsten from being deposited as black matter on the inside of the burner wall, a process referred to as 'blackening'. While these black deposits can settle anywhere on the inside wall of the burner, most are brought by convection currents to the top of the burner. However, this is also the hottest region in the lamp, so that the resulting darkened area will absorb heat and become even hotter, ultimately leading to crystallization of the quartz in that area, visible as a white discoloration of the quartz glass. Crystallization or 'whitening' is a relatively slow but irreversible process that leads to unsatisfactory performance and possibly even lamp failure or explosion.

To avoid such serious problems, some prior art solutions use a complex mechanical system allowing the cooling air stream to be re-directed, according to the position of the projector (desktop or ceiling), towards the top of the burner. Other systems have two fans, one for each 'end' of the burner, and a controller to select the fan speeds according to the position of the projector. This must be made known somehow, for example by relying on the user to select a certain input configuration, or by incorporating a motion sensor in the projector which can distinguish between an 'upward' (desktop) and 'downward' (ceiling) vertical orientation. However, such solutions add to the overall complexity and therefore the expense of a projector, and the solutions which rely on user input are subject to error.

Therefore, it is an object of the invention to provide an alternative, more efficient and more economical way of cooling a lamp.

SUMMARY OF THE INVENTION

The object of the invention is achieved by the method of cooling a lamp in a projector according to claim 1; the cooling module controller according to claim 10; the orientation-independent cooling arrangement for cooling a lamp in a projector according to claim 11; and the projector according to claim 12.

According to the invention, the method of cooling a lamp in a projector—independent of a vertical orientation of the projector—comprises directing a cooling airflow symmetrically at a burner of the lamp during operation of the lamp, and controlling the cooling airflow alternately between at least a first cooling level and a second cooling level such that, during cooling at the first cooling level, the temperature in a base region of the burner drops below a predefined minimum operating temperature to allow a blackening of an inside wall of the burner, and during cooling at the second cooling level, the temperature in an upper region of the burner increases above a predefined maximum operating temperature and the temperature in the base region of the burner increases above the predefined minimum operating temperature to facilitate a cleaning of the burner wall.

As already indicated in the introduction, blackening as a result of tungsten transport is a reversible process. The method according to the invention makes use of this fact by deliberately 'overcooling' the lamp (first cooling level) to allow blackening to build up and then promoting a 'recovery' phase (second cooling level) by allowing the temperature in the lamp to increase to the extent that the condensed mercury evaporates, the halide is released, the chemical cycle recovers, and the burner wall is cleaned. By interspersing the over-cooling with such 'warmer' cooling levels, the blackening created by the extreme cooling can be cleaned up again. In the method according to the invention, during overcooling of the lamp, not only is the bottom temperature below the predefined minimum operating temperature, the top temperature of the burner is also below the predefined maximum operating temperature.

Because the cooling airflow is directed at the burner of the lamp in a symmetrical or essentially uniform manner in the method according to the invention, the vertical orientation of the projector is no longer a factor to consider in cooling the lamp. Unlike the prior art cooling methods, the method according to the invention is free of any constraint to specifically cool the top, i.e. the hottest region of the burner. Instead, the method according to the invention simply alternates between a type of 'overcooling' (in which the burner base is extremely cooled while the burner top temperature is normal) and 'recovery' (in which the temperature at the burner top is allowed to rise above a recommended maximum, while the burner base temperature is normal), putting to good use the established knowledge that blackening is slow to build up but is easily and rapidly cleaned (here, the term 'normal' in the context of a temperature means that the temperature lies within the recommended specifications for that lamp type). For example, observations have shown that, when a lamp is driven at a high power so that the temperature in the lamp increases, the halogen cycle once again works effectively, and the deposited tungsten is retrieved. The invention uses this knowledge by simply manipulating the temperature in the lamp. By cooling the lamp 'too much' at the first cooling level, blackening is deliberately facilitated or 'allowed', and any blackening that might thus build up is then removed by subsequently allowing the temperature in the lamp to increase considerably, e.g. by deliberately not cooling the lamp enough. By continually switching between overcooling and recovery in this manner, permanent blackening deposits are effectively prevented, regardless of the projector orientation, so that potentially detrimental 'whitening' cannot develop. Regarded separately, neither the 'overcooling' nor the 'recovery' cooling levels are optimal. In fact, if either the overcooling or the recovery were to persist for too long, the lamp may be subject to the type of damage described in the introduction. The novel approach taken by the method according to the invention is to combine these cooling levels in such a way that a lamp can be cooled satisfactorily while being prevented from damage, for any vertical orientation of the projector.

Since no particular knowledge about the projector orientation or the actual temperature in the lamp is required, the method according to the invention is particularly simple and cheap to realize.

The cooling module controller according to the invention for use in an orientation-independent cooling arrangement of a projector is realized to generate a cooling module control signal for driving a cooling module of the projector alternately at a first cooling level and a second cooling level such that, during cooling at the first cooling level, the temperature in a base region of a burner of a lamp of the projector drops below a predefined minimum operating temperature to allow blackening of the inside wall of the burner, and during cooling at the second cooling level, the temperature in an upper region of the burner increases above a predefined maximum operating temperature and the temperature in the base region of the burner increases above the predefined minimum operating temperature to facilitate a cleaning of the burner wall.

According to the invention, the orientation-independent cooling arrangement for cooling a lamp in a projector independently of an orientation of the projector comprises such a cooling module controller, and a cooling module realized to generate a cooling airflow in response to a cooling module control signal of the cooling module controller and to direct the cooling airflow symmetrically at a burner of the lamp during operation of the lamp.

The projector according to the invention comprises a high-intensity discharge lamp and such a cooling arrangement for cooling the lamp using the method according to the invention.

The dependent claims and the following description disclose particularly advantageous embodiments and features of the invention. Features of the embodiments may be combined as appropriate.

A lamp driver is used in the usual manner to drive the lamp at a desired power by controlling the lamp voltage and current, as will be known to the skilled person.

In the following, 'temperature' is to be taken to mean the temperature in the burner of the lamp, and it is assumed that the temperature is controlled for the most part by the cooling airflow directed at the burner, and that any minor temperature fluctuations arising as a result of driving the lamp at varying power levels do not play a relevant part unless otherwise indicated. The term "base temperature" or "bottom temperature" is to be understood to mean the temperature at the base or bottom of the burner, while the term "top temperature" is to be understood to mean the temperature at the top of the burner, i.e. the region which becomes hottest as a result of an upward convection during operation of the lamp. Obviously, the actual physical region of the burner that is 'on top' for one vertical orientation (say, the desktop position) will be 'at the bottom' for the other opposite vertical orientation (the ceiling position).

The amount of blackening deposited in the burner of a certain lamp type operated at a low temperature for a certain time can be determined fairly well in experimentation, for example by using an appropriate sensor to measure the light output of the lamp. Similarly, the time required to clean up the blackening when the lamp is driven at a higher temperature can also be determined in a relatively straightforward manner. Therefore, in a particularly preferred embodiment of the invention, the burner is cooled at the first cooling level for a first predefined duration and at the second cooling level for a second predefined duration, where the first duration is preferably at most only so long as to allow a low level of blackening to occur, and the second duration is sufficiently long for the blackening to be cleaned up again, but not so long as to allow crystallization to take effect. The first and second durations can be controlled using timers. Thereby, the relative lengths of the first and second durations can be chosen as appropriate. For example, for a particularly simple realization, the first and second durations can comprise equal lengths of time, in which case a single timer would suffice.

Since the dark deposits build up relatively slowly on the burner inside walls but can be removed quite quickly by allowing the lamp temperature to increase by a sufficient amount, in a preferred embodiment of the invention the first predefined duration exceeds the second predefined duration, i.e. the second cooling level is shorter than the first cooling level. For example, depending on the lamp and the system in which it is being used, a ratio of the first duration to the second duration can comprise a value in a range between 3:2 and 20:1. Preferably, the ratio of the first duration to the second duration comprises a value of about 7:3, so that, for example, the lamp is overcooled (meaning that the burner base temperature is allowed to drop below the recommended minimum) at the first cooling level for about 14 minutes and subsequently recovers (meaning that the burner base temperature is made to rise above the recommended minimum, and the burner top temperature rises above the recommended maximum as a result) at the second cooling level for about 6 minutes. Evidently, the first and second durations may also be chosen according to the type of lamp being driven. In some realizations therefore, it may even be preferred to control the cooling so that the first duration is shorter than the second duration.

The cooling airflow can be generated in any suitable manner. In a particularly straightforward solution, however, a fan is used to generate the cooling air stream, since such fans or ventilators for use in projection systems are widely available. Generally, the speed at which such a fan rotates is directly proportional to the cooling effect of the resulting air stream. Therefore, in a particularly preferred embodiment of the invention, a cooling level is obtained by directing the cooling airflow at the lamp burner at a predefined fan speed. The fan speed is usually controlled by adjusting a voltage applied to the fan. For example, an increase in fan voltage is usually associated with an increase in fan speed.

As already indicated above, alternating between 'overcooling' phases and a recovery phases of fixed durations can give very satisfactory cooling results. However, under certain circumstances, for example because of certain video rendering requirements, the lamp driver may cause the lamp power to be temporarily increased or decreased, with a resulting increase or decrease in lamp temperature. Such an additional influence on the lamp temperature could lead, for example, to an excessively low temperature during a first cooling level (the drop in temperature due to low lamp power combined with the drop in temperature at the first cooling level) and a higher degree of blackening, or to an excessively high temperature during a second cooling level (the increase in temperature due to high lamp power combined with the increase in temperature at the second cooling level). Therefore, in a preferred embodiment of the invention, the duration of a cooling level and/or the extent of a cooling level are chosen on the basis of a lamp power value. The lamp power value can be provided by the lamp driver, and be used to influence the duration of the first and/or second cooling level, or the intensity of cooling. For example, if the lamp is driven for a while at a low power, the temperature in the lamp will drop as a result, and the cooling module controller may reduce the duration spent at the first cooling level accordingly. Equally, the cooling module controller could adjust the fan speed to reduce the extent of cooling. Evidently, the cooling module controller could combine both approaches, i.e. by adjusting the time spent in a cooling mode as well as adjusting the extent of the actual cooling.

Since small fluctuations in lamp power over time could, for example, result in a cumulative blackening in the lamp which may not be satisfactorily removed during operation at the second cooling level, in a further preferred embodiment of the invention the duration and/or extent of a cooling level are chosen on the basis of a lamp power history. In this way, small fluctuations in lamp power can be compensated for by adjusting the durations of the first and/or second cooling levels and/or the intensity of these cooling levels. A lamp power history can be, for example, a list of lamp power values obtained at discrete intervals, an average lamp power value determined over a certain time period, or any other suitable value that can be used as a basis for adjusting the durations of the first and/or second cooling levels.

Knowledge of the lamp power in the operating history of the lamp can be used to infer or deduce the extent of the blackening, as described above. However, the blackening can also be measured directly, for example by using a sensor. Therefore, in a preferred embodiment of the invention, the duration and/or extent of a cooling level is chosen on the basis of a lamp blackening value obtained, for example, by measuring a drop in light output of the lamp. Such a sensor can be any suitable sensor placed in an appropriate position for detecting changes in the lamp's luminous output.

The cooling parameters such as duration and/or fan speed could also be chosen so that a long-term temperature condition is satisfied. In another preferred embodiment of the invention, therefore, the duration of a cooling level and/or a fan speed are chosen such that an 'average' temperature at the base region of the lamp burner is greater than a predefined minimum temperature, where the term "average temperature" might be a running average of the burner base temperature measured over a certain length of time. Predefined values for cooling level durations and/or fan speeds for a lamp type can be determined in a test phase by monitoring the lamp temperature, for example, and applying various combinations of fan speed and cooling level duration to determine favorable settings.

A cooling module of a projector system can be driven in any appropriate manner. In one embodiment of the projector system according to the invention, a cooling module controller is preferably realized as part of the lamp driver. Signals for controlling the cooling module such as a fan voltage for controlling the fan speed, can be directly generated by the cooling module controller in the lamp driver and connected to the cooling module. Such a solution would be favorable for a simple cooling algorithm in which first and second cooling levels alternate at fixed durations. If the lamp driver is realized to monitor lamp parameter values such as lamp power, lamp operating history, etc., this information can be used to control the cooling module.

A more complex projector system may include a set controller for managing operational aspects of the system as well as for controlling the cooling module. Therefore, in a further preferred embodiment of a projector system according to the invention, the cooling module controller is realized as part of a set controller. In such a solution, the cooling arrangement and the lamp driver are separate modules of the projector system.

Regardless of how the cooling module controller is incorporated into the projection system, the cooling module can be controlled so that changes in the cooling levels are kept inconspicuous. For example, in a preferred embodiment of the invention, the fan speed can be ramped up (down) when increasing (decreasing) the fan voltage, in order to minimize any noticeable increase (decrease) in noise. This can be achieved by ramping an appropriate control signal, for example a fan voltage signal.

BRIEF DESCRIPTION OF THE DRAWINGS

In the drawings, like numbers refer to like objects throughout. Objects in the diagrams are not necessarily drawn to scale.

DETAILED DESCRIPTION OF THE EMBODIMENTS

Figure 1:
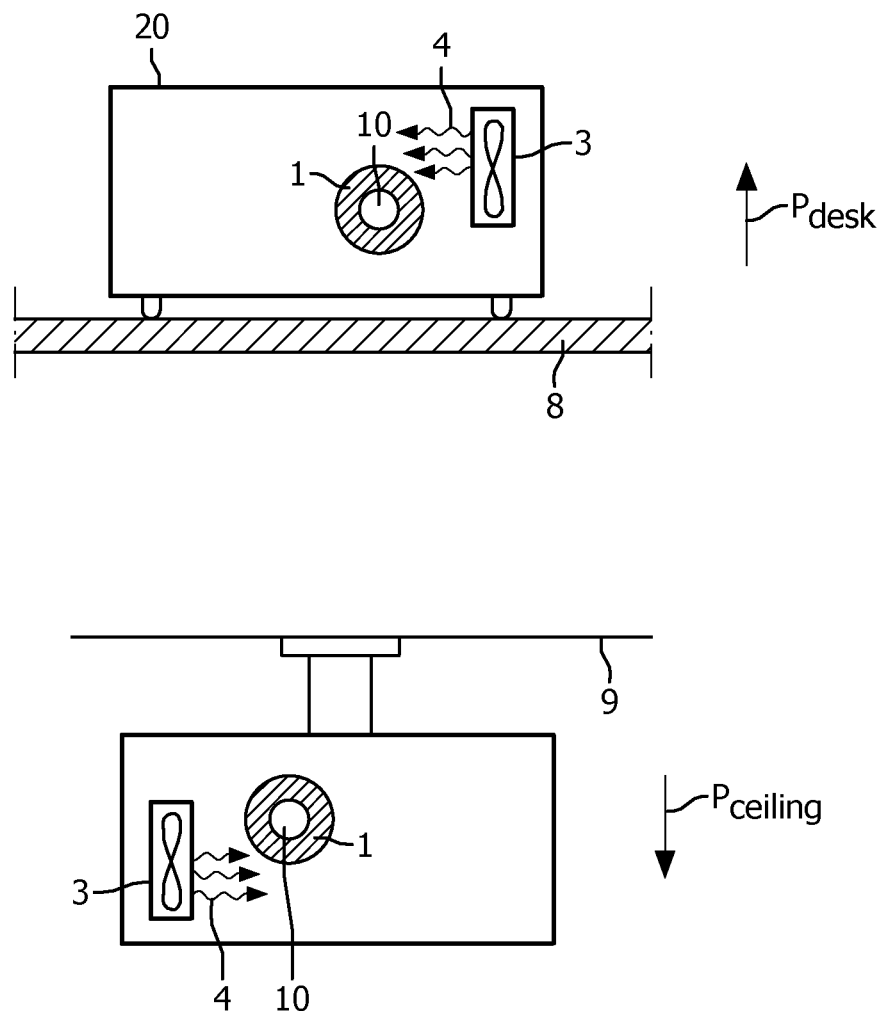
FIG. 1 is a simplified diagram of a prior art cooling arrangement for a lamp of a projector system in different vertical orientations.
Figure 2:
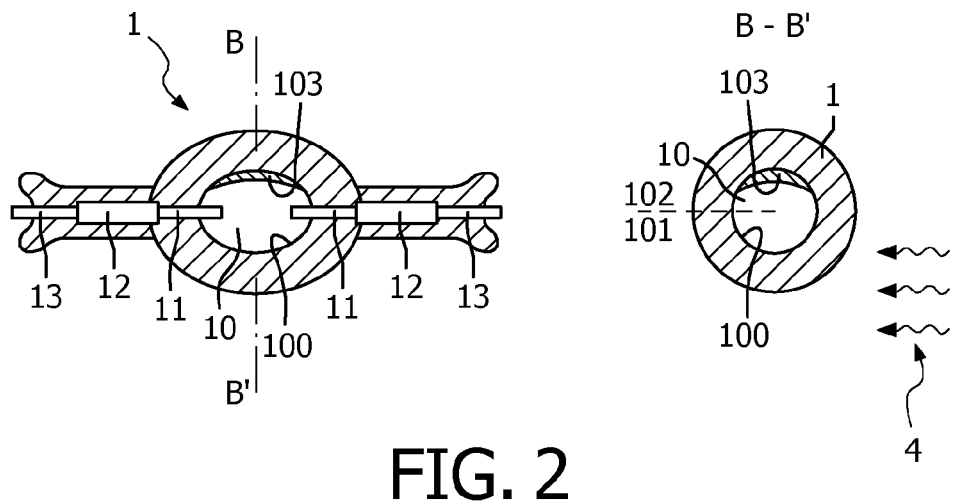
FIG. 2 is a schematic representation of a lamp showing burner blackening owing to incorrect cooling by a prior art cooling arrangement.

FIG. 1 shows a simplified diagram of a prior art cooling arrangement for a lamp 1 in a projector system 20 in different vertical orientations $P_{desk}$, $P_{ceiling}$. This projector system 20 can be operated from a desktop position $P_{desk}$ as shown in the upper part of the diagram, by placing the projector 20 on a suitable surface such as a table 8. A fan 3 is arranged in the projector 20 to direct a cooling airflow 4 at the lamp 1, specifically at the top or upper region of the lamp 1. In this way, the lamp 1 is optimally cooled, since the part of the lamp 1 that gets hottest is also cooled the most. When this projector 20 is suspended from a surface such as a ceiling and used in a ceiling position $P_{ceiling}$, as shown in the lower part of the diagram, the fan 3 now blows air 4 at the bottom of the lamp 1. Since the bottom of the lamp 1 is now cooled too much, black material can be deposited on the inner surface of the top of the burner. These deposits can absorb more heat, causing an irreversible crystallization at the top of the lamp 1. This is illustrated with the aid of FIG. 2, which, on the left-hand side, shows a schematic representation of a burner 1 of the type used in a projector, in this case a mercury halide HID lamp. A quartz glass envelope encloses a burner 10 or discharge chamber 10. Two electrodes 11 protrude in to the burner 10. The electrodes 11 are connected to external leads 13 by means of molybdenum foil strips 12. During operation of the lamp 1, a discharge arc is generated between the tips of the electrodes 11. Convection currents cause the temperature at an upper region 102 of the burner 10 to be higher than in a lower region 101. If the temperature in the base of the lamp 1 is too low on account of a cooling airflow 4 directed at the lower part 101 of the burner 10, mercury can condense and excessive amounts of the halide can dissolve in the liquid mercury. As a result, evaporated electrode constituents such as tungsten which can no longer be reabsorbed are carried upward by the convection currents and deposited as material 103 on the burner wall 100 in the upper region 102 of the lamp 1. This is shown schematically in the cross-section B-B' on the right hand side of the diagram. Of course, such deposits 103 can settle at any region on the inside wall 101 of the burner 100, and this diagram merely emphasizes the critical region 102.

Figure 3:
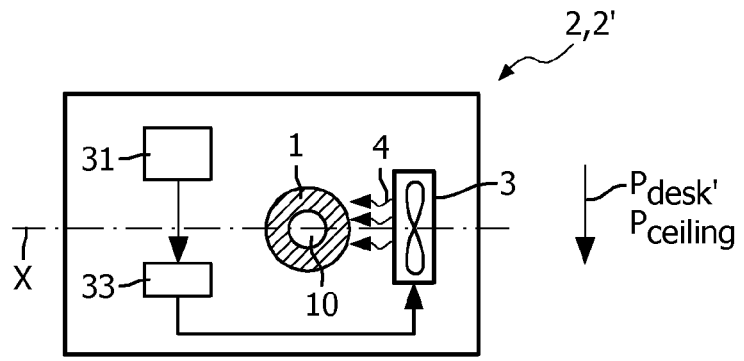
FIG. 3 is a block diagram of a projector with a cooling arrangement according to an embodiment of the invention.

FIG. 3 is a block diagram of a projector 2, 2' with a cooling arrangement comprising a cooling arrangement controller 31, a cooling module driver 33 and a cooling module 3, in this case a fan 3 arranged to direct a cooling airflow 4 symmetrically about the burner 10 of a lamp 1. The cooling arrangement controller 31 supplies signals for adjusting parameters such as fan speed to the cooling module driver 33, which in turn converts these signals to a fan voltage for controlling the fan 3. Since the airflow 4 is directed symmetrically at the burner 10, essentially along a horizontal axis X, the vertical orientation of the projector 2, 2' is irrelevant, and this can be operated in a desktop orientation $P_{desk}$ or in a ceiling orientation $P_{ceiling}$, as desired. The extent of cooling achieved by the airflow 4 is controlled by the cooling arrangement 30, as will be explained below.

Figure 4:
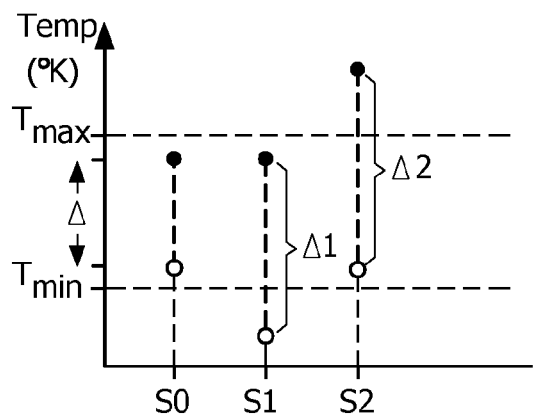
FIG. 4 is a representation of temperatures achieved in a lamp burner for various operating situations.

FIG. 4 is a representation of temperatures achieved in a lamp burner for various operating situations. The temperature in the top part of the burner for each situation is indicted by a black dot, and the corresponding temperature in the bottom part of the burner is indicated by a white dot. In an optimal situation S0, the top temperature is less than a maximum desirable temperature $T_{max}$ (to minimize crystallization), and the bottom temperature is higher than a minimum desirable temperature $T_{min}$ (to prevent mercury condensation). The difference or delta $\Delta$ between these temperatures for a lamp such as a UHP lamp is generally about 50 to 100° K, whereby the recommended maximum temperature $T_{max}$, the minimum temperature $T_{min}$ and the delta $\Delta$ are dependent on the lamp type. In a first suboptimal situation S1, the bottom temperature is considerably lower than the minimum desirable temperature $T_{min}$ in the optimal situation S0, and the top temperature can also be lower than the maximum desirable temperature $T_{max}$. A difference $\Delta 1$ between top and bottom temperatures for this situation S1 is larger than the recommended or ideal delta $\Delta$. This sub-optimal situation S1 is associated with a saturated regime, in which a halide dissolves in the mercury, leading to blackening of the inside walls of the burner. In a second sub-optimal situation S2, the bottom temperature is higher than the minimum desirable temperature $T_{min}$, and the top temperature is also correspondingly higher than the maximum desirable temperature $T_{max}$. Again, a difference $\Delta 2$ between top and bottom temperatures is larger than the recommended or ideal delta $\Delta$. This situation S2 is associated with operation in an unsaturated regime, albeit at temperatures higher than what would be considered desirable in the long-term, but which is useful in the short-term for a cleaning of the inside walls of the burner to remove any black deposits that may be on the walls of the burner.

Figure 5:
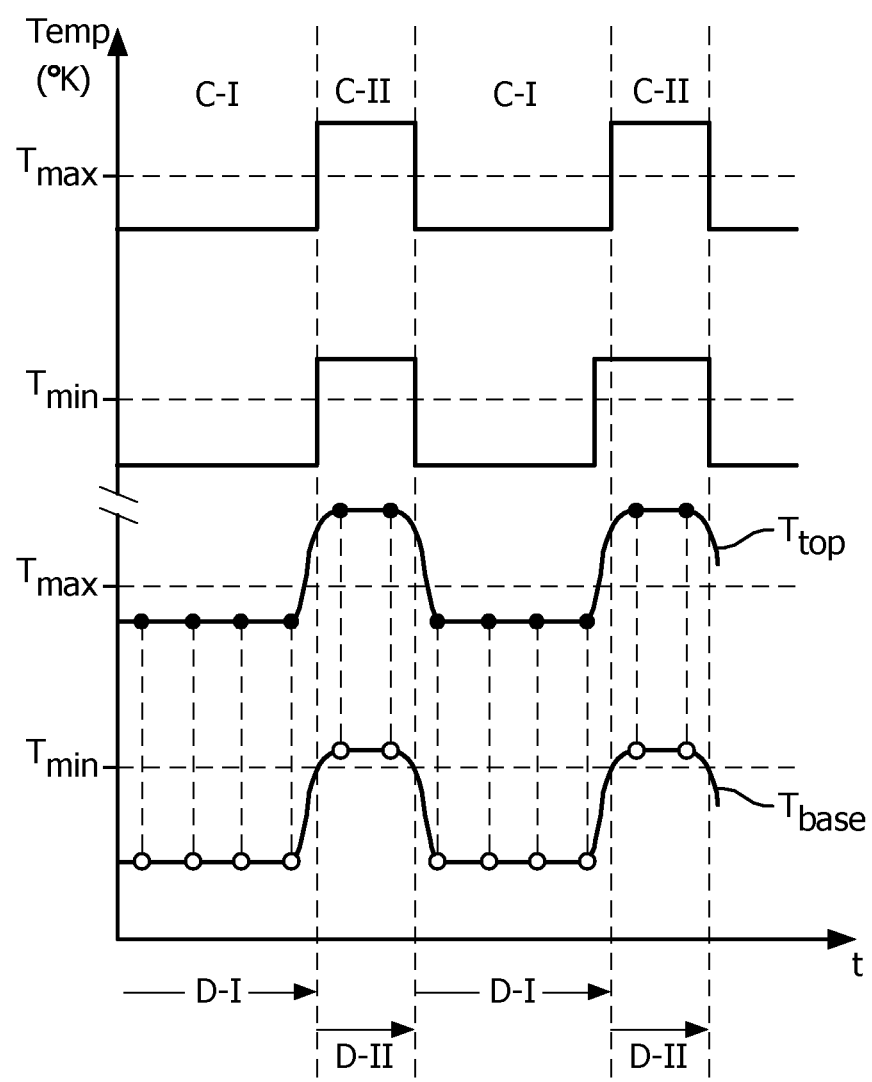
FIG. 5 is a schematic representation of a cooling scheme according to an embodiment of the invention, and corresponding lamp burner temperature curves.

FIG. 5 is a schematic representation of a cooling scheme according to an embodiment of the invention, which makes use of the sub-optimal situations S1 and S2 of FIG. 5 to give a favorable cooling technique. Here, a lamp is cooled alternately at a first cooling level C-I and a second cooling level C-II. The first cooling level C-I can correspond to 'situation S1' of FIG. 5, in which the lamp is cooled 'too much' and is caused to operate in a saturated regime. Blackening may well arise during the first cooling level C-I. A timely change-over to the second cooling level C-II and the corresponding 'overheating' of the lamp for a short period allows any blackening to be cleaned up again before crystallization can occur. Thereafter, the lamp is once again cooled according to the first cooling level C-I, and so on. The lower part of the diagram illustrates temperature curves $T_{top}$, $T_{base}$ for the burner's top and bottom regions respectively. Again, the burner top temperature is indicated by a black dot and the burner base temperature is indicated by a white dot. As these curves indicate, the lamp is not driven in the 'ideal' situation for any length of time, but is deliberately driven alternately in sub-optimal 'overcooled' and 'overheated' situations. In experiments with a 220 W 1.0 E20.6 UHP lamp, a bottom temperature $T_{base}$ (i.e. the temperature at the base of the burner) of 740° C. was observed during the first duration D-I in which the lamp was subject to an 'extreme' cooling at the first cooling level C-I. This temperature is well below the recommended minimum temperature $T_{min}$ for this lamp type, so that a certain amount of blackening can be expected to develop in this time. In the subsequent recovery period D-II at the second cooling level C-II, the temperature was allowed to rise, and a bottom temperature $T_{base}$ of 840° C. was observed. This is sufficient to remedy or dispel any blackening that may have developed in the previous cooling level.

Figure 6:
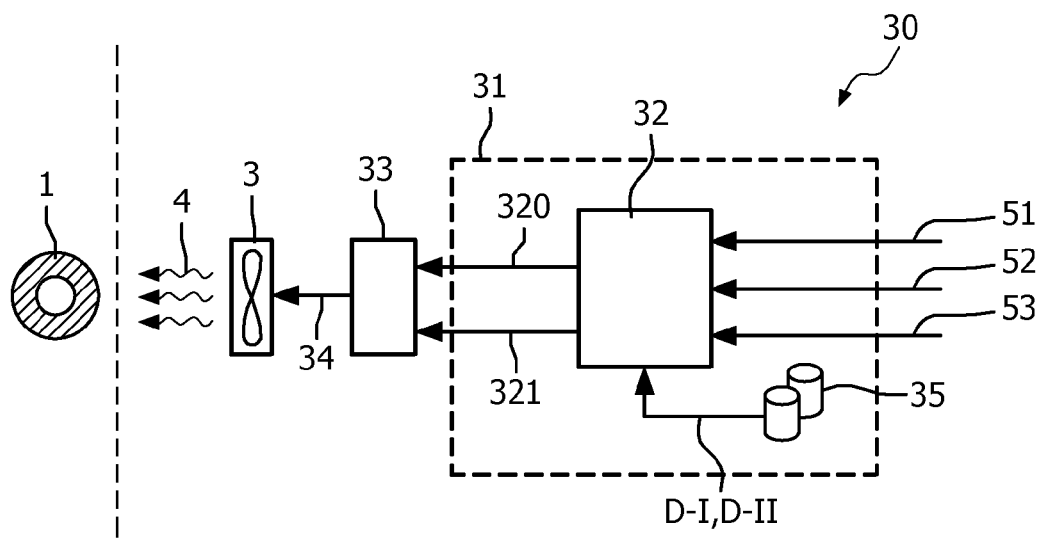
FIG. 6 is a block diagram of a lamp and a cooling arrangement according to an embodiment of the invention.

FIG. 6 is a block diagram of a cooling arrangement 30 according to an embodiment of the invention to the right of the broken line realized to direct a cooling airflow symmetrically about a lamp 1. The cooling arrangement 30 comprises a cooling module 3, in this case a fan 3, and cooling module controller 31. The cooling module controller 31 can receive one or more input signals. In this example, the cooling module controller 31 receives a lamp power value 51, a lamp operating history value 52, and a sensor measurement value 53. These are forwarded to an analysis module 32, which interprets the received information. On the basis of the data received, the analysis module can compute a duration and a corresponding fan speed, or can use predefined durations D-I, D-II and corresponding fan speeds F-I, F-II retrieved from a memory 35, and outputs these as a duration signal 320 and a corresponding fan speed signal 321 to a cooling module driver 33, which converts the fan speed signal 321 to a suitable cooling module control signal 34, for example a fan voltage 34 and maintains this for the determined duration. The analysis module 32 continually supplies a suitable duration signal 320 and fan speed signal 321 according to the predefined values stored in the memory 35 or according to the inputs 51, 52, 53 received during operation. For example, the analysis module 32 may simply drive the cooling module according to the predefined values, switching for the main part between two cooling schemes. However, the additional inputs 51, 52, 53 can influence the cooling strategy. For example, a sensor measurement value 53 may indicate that the level of lamp blackening is too high. The analysis module 32 may then decide to drive the cooling module 3 such that cooling is severely reduced for a while, for example by reducing fan speed and fan voltage to allow the temperature in the lamp to reach a relatively high value, thereby evaporating the mercury and cleaning the burner walls. Equally, a lamp power value or a lamp history value can indicate that, for specific image rendering purposes, the lamp is being driven at a certain power value for a while. For example, the lamp may be driven at a lower power to render a dimmed scene, and is therefore cooler. To counteract this, the analysis module can increase the duration of the 'undercooling' cooling level by computing an appropriately long duration and/or low fan speed. Thereafter, the analysis module 32 can revert to using the predefined durations D-I, D-II and corresponding fan speeds F-I, F-II retrieved from the memory 35.

Figure 7:
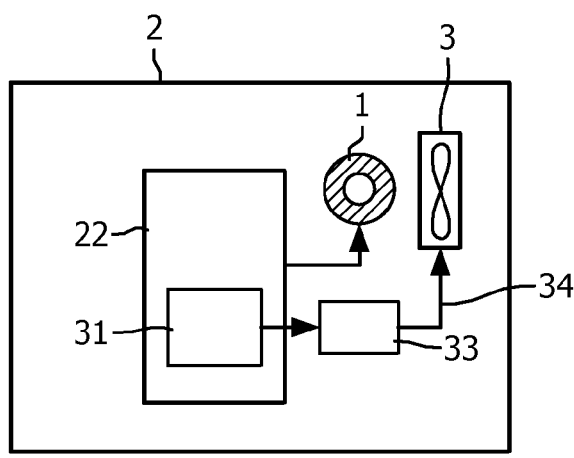
FIG. 7 is a block diagram of a projector system according to a first embodiment of the invention.

FIG. 7 is a block diagram of a projector system 2 according to a first embodiment of the invention. Here, the projector 2 includes a driver 22 for driving the lamp 1 according to a video input signal (not shown) in the usual manner. The driver 22 includes a cooling module controller 31 which supplies suitable signals for a specific duration to a cooling module driver 33, which generates a corresponding fan voltage 34 for a cooling fan 3. The cooling fan 3 is arranged to blow a cooling air stream symmetrically about the burner of the lamp 1, i.e. so that the airstream is divided more or less evenly around the burner as it passes the lamp. In this simple realization, the fan voltage 34 and its corresponding duration can be easily determined by the cooling module controller 31 using pairs of predefined values D-I, F-I; D-II, F-II retrieved from a memory as described above. The lamp 1 of the projector system 2 can therefore be safely cooled in either desktop or ceiling position.

Figure 8:
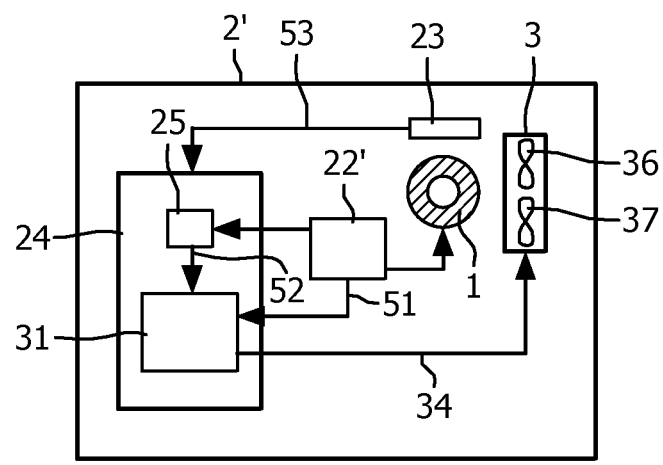
FIG. 8 is a block diagram of a projector system according to a second embodiment of the invention.

FIG. 8 is a block diagram of a projector system 2' according to a second embodiment of the invention. In this example, the projector system 2' includes a driver 22' for driving the lamp 1 and an additional set controller 24. The cooling module 3 here comprises two separately controllable fans 36, 37 arranged to direct a combined cooling airflow symmetrically about the burner of the lamp 1. The fans 36, 37 can be driven by a single control signal 34, or the control signal 34 can comprise separate control signals to drive each of the fans 36, 37 independently. The set controller 24 includes a cooling module controller 31 which is given a sensor measurement signal 53 from an infrared blackening sensor 23, a lamp power signal 51 from the driver 22', and a lamp power history signal 52 from a monitoring unit 25 of the set controller 24. Using these sources 51, 52, 53 of lamp-related information in addition to predefined values retrieved from a memory (not shown), the cooling module controller 31 can intelligently control the fans of the cooling module 3 to cool the lamp 1 very effectively for any vertical orientation of the projector system 2'.

Figure 9:
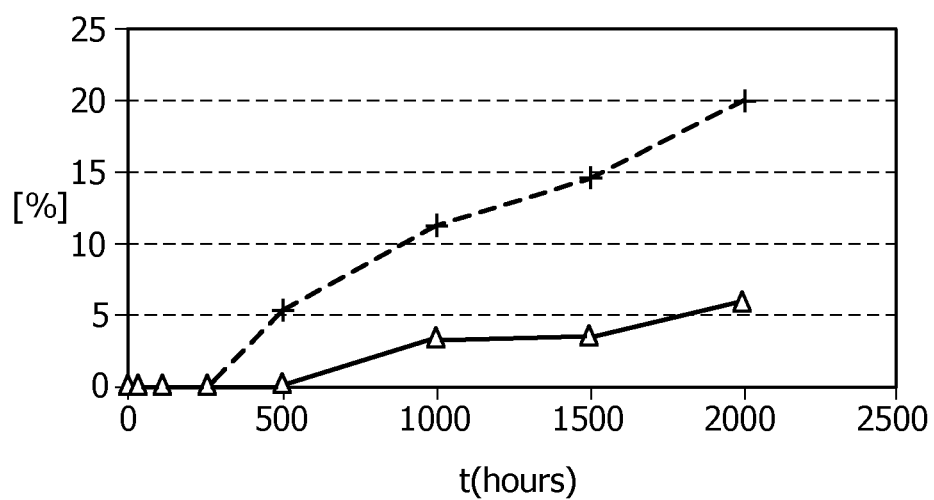
FIG. 9 shows a graph of experimental results obtained for the method according to the invention.

The favorable cooling effect of the method according to the invention is made clear by the graph of FIG. 9, which shows a crystallization curve (broken line) for a reference lamp of a projector operated in the suboptimal S2-mode, and a crystallization curve (solid line) for a lamp in a projector system cooled using the method according to the invention. Each lamp (type UHP 220 W 1.0 E20.6), was operated for 2,000 hours, and the level of crystallization in the lamp envelope was visually measured at intervals during this time. As the graph clearly shows, the reference lamp showed significantly more crystallization (reaching 20%, i.e. a fifth of the burner wall surface became milky white in this time), while the lamp cooled using the method according to the invention showed a comparably very favorable 5% crystallization. Furthermore, crystallization appeared in the reference lamp after only 250 hours of operation. The lamp cooled using the method according to the invention remained free of any crystallization for the first 500 hours of operation. Although the present invention has been disclosed in the form of preferred embodiments and variations thereon, it will be understood that numerous additional modifications and variations could be made thereto without departing from the scope of the invention. For example, the analysis module in the cooling arrangement controller could use any other appropriate operating value or parameter to determine a suitable duration and cooling module operating parameter such as fan speed.

For the sake of clarity, it is to be understood that the use of "a" or "an" throughout this application does not exclude a plurality, and use of the word "comprising" does not exclude other steps or elements. A "unit" or "module" can comprise a plurality of units or modules, respectively.

The invention claimed is:

1. A method of cooling a lamp (1) in a projector (2, 2') independently of an orientation ($P_{desk}$, $P_{ceiling}$) of the projector (2, 2'), which method comprises directing a cooling airflow (4) symmetrically at a burner (10) of the lamp (1) during operation of the lamp (1); and controlling the rate of cooling airflow (4) alternately between at least a first cooling level (C-I) and a second cooling level (C-II) such that, during cooling at the first cooling level (C-I), the temperature ($T_{base}$) in a base region of the burner (10) drops below a predefined minimum operating temperature ($T_{min}$) to allow a blackening of an inside wall (100) of the burner (10), and during cooling at the second cooling level (C-II), the temperature ($T_{top}$) in an upper region of the burner (10) increases above a predefined maximum operating temperature ($T_{max}$) and the temperature ($T_{base}$) in the base region of the burner (10) increases above the predefined minimum operating temperature ($T_{min}$) to facilitate a cleaning of the burner wall (100);

wherein the rate of cooling airflow during the second cooling level (C-II) is less than the rate of cooling airflow at the first cooling level (C-I).

2. A method according to claim 1, wherein the lamp burner (10) is cooled at the first cooling level (C-I) for a first predefined duration (D-I) and the lamp burner (10) is cooled at the second cooling level (C-II) for a second predefined duration (D-II).

3. A method according to claim 1, wherein the first predefined duration (D-I) exceeds the second predefined duration (D-II).

4. A method according to claim 2, wherein the ratio of the first predefined duration (D-I) to the second predefined duration (D-II) comprises a value between 3:2 and 20:1.

5. A method according to claim 2, wherein a cooling level (C-I, CII) is obtained by directing the cooling airflow (4) at the lamp burner (10) at a redefined fan speed (S-I, S-II); wherein the fan speed during the second cooling level (C-II) is less than the fan speed during the first cooling level (C-I).

6. A method according to claim 2, wherein the duration (D-I, D-II) of a cooling level (C-I, C-II) and/or the extent of a cooling level (C-I, C-II) are chosen on the basis of a lamp power value (51).

7. A method according to claim 2, wherein the duration (D-I, D-II) of a cooling level (C-I, C-II) and/or the extent of a cooling level (C-I, C-II) are chosen on the basis of a lamp power history (52).

8. A method according to claim 2, wherein the duration (D-I, D-II) of a cooling level (C-I, C-II) and/or the extent of a cooling level (C-I, C-II) are chosen on the basis of a lamp blackening value (53).

9. A method according to claim 2, wherein the duration (DI, DII) of a cooling level (C-I, C-II) and/or a fan speed are chosen such that an average temperature at the base region (101) of the lamp burner (10) is greater than a predefined minimum temperature.

10. A cooling module controller (31) for use in an orientation-independent cooling arrangement (30) of a projector (2, 2'), which cooling module controller (31) is realized to generate a cooling module control signal (34) for driving a cooling module (3) of the projector (2, 2') alternately at a first cooling level (C-I) and a second cooling level (C-II) such that, during cooling at the first cooling level (C-I), the temperature ($T_{base}$) in a base region of a burner (10) of a lamp (1) of the projector (2, 2') drops below a predefined minimum operating temperature ($T_{min}$) to allow a blackening of an inside wall (100) of the burner (10), and during cooling at the second cooling level (C-II), the temperature ($T_{top}$) in an upper region of the burner (10) increases above a predefined maximum operating temperature ($T_{max}$) and the temperature ($T_{base}$) in the base region of the burner (10) increases above the predefined minimum operating temperature ($T_{min}$) to facilitate a cleaning of the burner wall (100);

wherein the cooling module supplies a cooling effect upon the burner and wherein the cooling effect is reduced during cooling at the second cooling level (C-II).

11. An orientation-independent cooling arrangement (30) for cooling a lamp (1) in a projector (2, 2') independently of an orientation ($P_{desk}$, $P_{ceiling}$) of the projector (2, 2'), which cooling arrangement (30) comprises a cooling module controller (31) according to claim 10, and
a cooling module (3) realized to generate a cooling airflow (4) in response to the cooling module control signal (34) of the cooling module controller (31) and to direct the cooling airflow (4) symmetrically at a burner (10) of the lamp (1) during operation of the lamp (1).

12. A projector (2, 2') comprising a high-intensity discharge lamp (1) and the cooling arrangement (30) of claim 11 for cooling the lamp.

13. A projector (2) according to claim 12, comprising a lamp driver (22) and wherein the cooling module controller (31) is realized as part of the lamp driver (22).

14. A projector (2') according to claim 12, comprising a lamp driver (22') and a set controller (24), wherein the cooling module controller (31) is realized as part of the set controller (24).

15. A method according to claim 2, wherein the ratio of the first predefined duration (D-I) to the second predefined duration (D-II) is approximately equal to 7:3.

* * * * *